A. W. FARIS.
Butter-Mold.
No. 196,573. Patented Oct. 30, 1877.
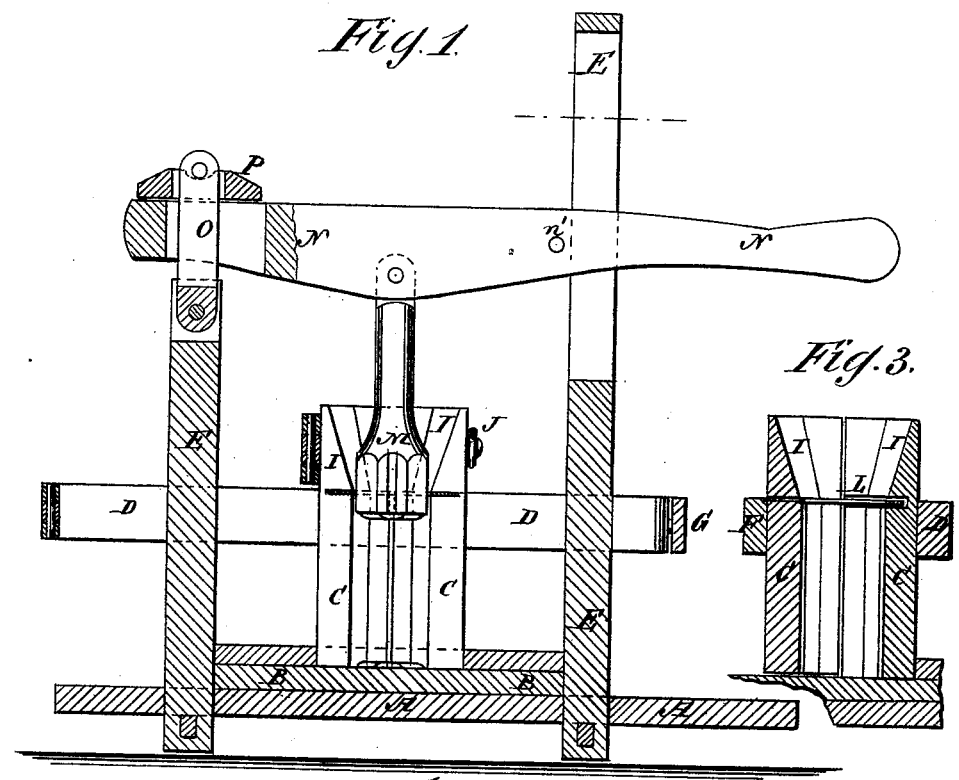
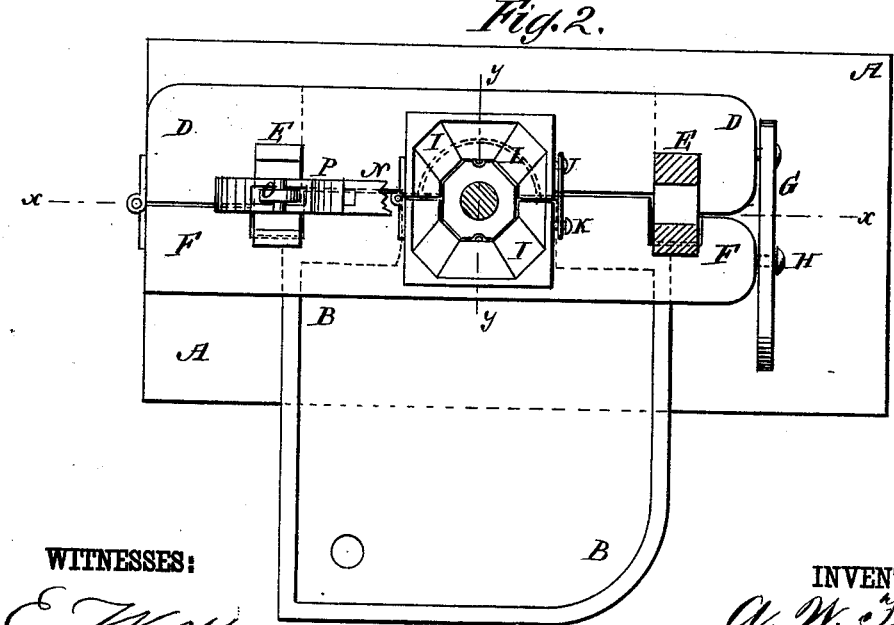
WITNESSES:
E. Wolff
J. H. Scarborough
INVENTOR:
A. W. Faris.
BY Munn & Co.
ATTORNEYS.

UNITED STATES PATENT OFFICE.

AUGUSTUS W. FARIS, OF RED SULPHUR SPRINGS, WEST VIRGINIA.

IMPROVEMENT IN BUTTER-MOLDS.

Specification forming part of Letters Patent No. 196,573, dated October 30, 1877; application filed September 29, 1877.

*To all whom it may concern:*

Be it known that I, AUGUSTUS W. FARIS, of Red Sulphur Springs, in the county of Monroe and State of West Virginia, have invented a new and useful Improvement in Butter-Press, of which the following is a specification:

Figure 1 is a vertical section of my improved butter-press, taken through the line $xx$, Fig. 2. Fig. 2 is a top view of the same, partly in horizontal section, to show the construction. Fig. 3 is a detail section of the hopper and mold, taken through the line $yy$, Fig. 2.

Similar letters of reference indicate corresponding parts.

The object of this invention is to furnish an improved machine for pressing, shaping, and printing butter, which shall be simple in construction, convenient in use, and effective in operation, pressing out the milk and water, so that the butter will keep sweet, and bringing it into packages or blocks of uniform size, so that it can be readily packed into boxes for market, making it more convenient for transportation and for the retailer.

The invention consists in the combination of the mold, made in two parts, attached to the stationary bar, and the hinged bar, the hopper I, made in two parts, hinged to each other, the knife L, the follower, and the lever and its flexible connection, with each other, and with the posts, the apron, and the bed-plate, as hereinafter fully described.

A is the bed-plate of the machine, to which is attached an apron, B, having a low flange around its edge, to prevent the milk and water pressed from the butter from running off said edges, and compel it to flow through a hole in said apron into some suitable receiver. C is the mold, which is made of the shape and size desired to be given to the package of butter.

The mold C is made in two parts, one of which is attached to the bed-plate and apron A B and to the cross-bar D, attached to the posts E. The other part of the mold C is attached to the cross-bar F, which is hinged at one end to the end of the cross-bar D, and is secured at its other end by a latch, G. The latch G is pivoted to the end of the cross-bar D, and latches or hooks upon a headed pin or other catch, H, attached to the end of the hinged bar F.

I is the hopper, which is also made in two parts, one stationary and attached to or formed upon the upper end of the stationary half of the mold C, and the other movable and hinged to the other or stationary part.

J is a hook or latch, which is pivoted to the stationary part of the hopper, and hooks or latches upon a headed pin or other catch, K, attached to the hinged part of said hopper.

To the bottom of the hinged part of the hopper I are attached the ends of a semi-ring knife, L, which, when the hopper is closed, shuts into a groove formed to receive it in the stationary part of the hopper, and which is designed to cut off the surplus part of the butter-package and leave its upper end smooth.

The inner surface of the mold may have grooves or ribs formed in or attached to it to mark the butter, so that it can be cut into pound or half-pound pieces by the retailer without the necessity of weighing them. The inner surface of the mold C may also be provided with countersinks or projections to print the sides of the packages of butter, if desired.

The butter is pressed down into the mold C by the follower M, the face of which is provided with a stamp to print the top of the package. The follower M is pivoted to the lever N, the end of which is slotted to receive the short bar O, which is jointed to the post E, and has a cross-pin through its upper end.

The cross-pin of the bar O rests upon the top of the saddle P, which is slotted to receive the bar O, and is designed to prevent the lever N from binding. This flexible connection allows the lever N to have sufficient longitudinal movement to enable the follower M to work vertically in the mold C, so that it will not bind. The forward part of the lever N passes through a slot in the forward post E, and its longitudinal movement may be limited by cross-pins $n'$ passed through it to strike against the said post E.

In using the press, the butter is placed in the hopper I, and is pressed down into the mold C by the follower M. The follower M is then raised, and the hinged part of the hopper I is swung back, which causes the knife L to cut off the surplus butter, leaving the top of the package smooth. The follower M is again pressed down to print the top of the package, and is again raised. The movable part of the hopper C may then be swung back, and the package of butter taken out.

The butter-packages are designed to be wrapped in cloths and packed in boxes, so that they can be readily removed.

Having thus described my invention, I claim as new and desire to secure by Letters Patent—

The combination of the mold C, made in two parts, attached to the stationary bar D, and the hinged bar F, the hopper I, made in two parts, hinged to each other, the knife L, the follower M, the lever N, and its flexible connection O P, with each other, and with the posts E, the apron B, and the bed-plate A, substantially as herein shown and described.

A. W. FARIS.

Witnesses:
R. C. MURVILL,
I. R. ADAIR.